Aug. 7, 1956
A. JOHNSON
2,757,712
ADJUSTABLE VEHICLE SEAT SUPPORT
Filed April 27, 1953
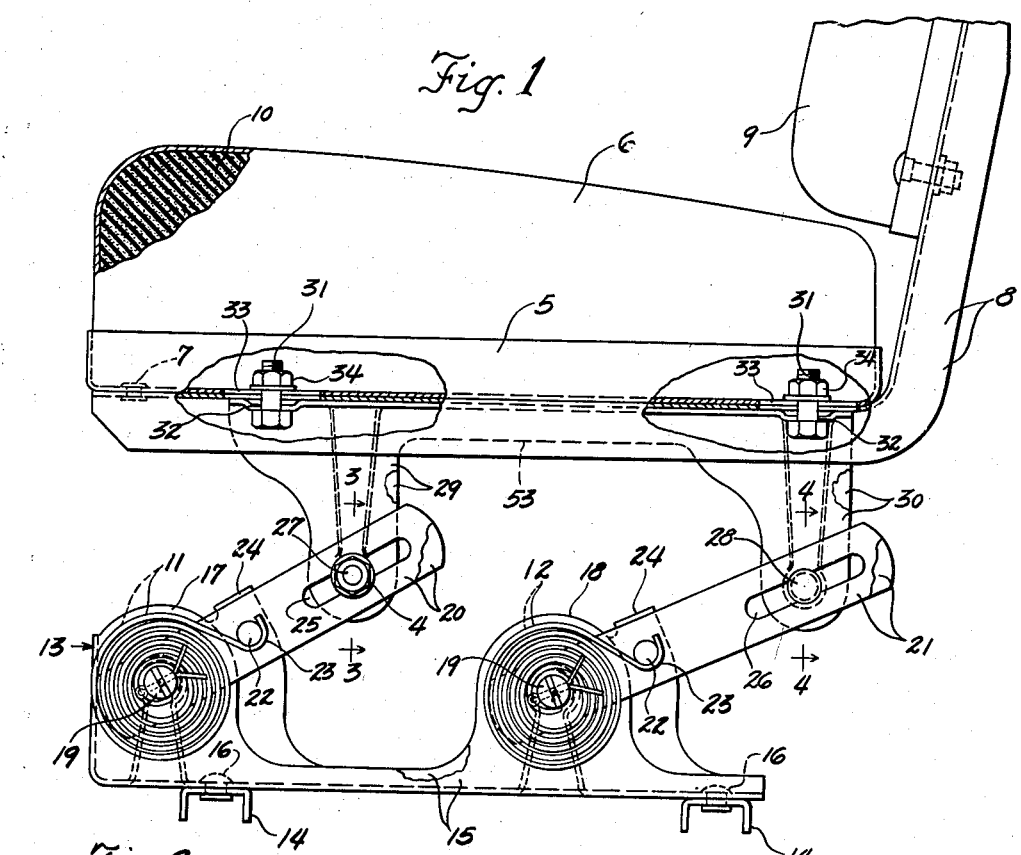
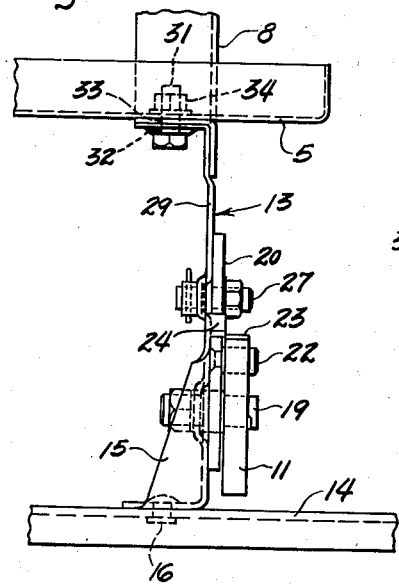
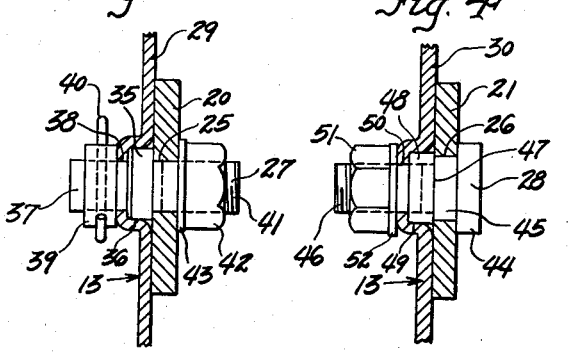
INVENTOR.
Agnar Johnson
ATTY.

United States Patent Office 2,757,712
Patented Aug. 7, 1956

2,757,712

ADJUSTABLE VEHICLE SEAT SUPPORT

Agnar Johnson, Rockford, Ill., assignor to Atwood Vacuum Machine Company, Rockford, Ill., a corporation of Illinois Application April 27, 1953, Serial No. 351,404

16 Claims. (Cl. 155—9)

This invention relates to an adjustable seat support for use in vehicles generally, but especially designed and adapted for use on tractors, trucks, and similar rough riding vehicles, to enable a driver to obtain by simple adjustments as "soft" or "hard" riding characteristics as he prefers, whereby to compensate for differences in weights of drivers and enable obtaining as easy riding for a lighter weight driver as for a heavier one, and accordingly reduce fatigue for all drivers to a minimum.

The salient features of the seat support of my invention are:

(1) the provision of auxiliary springs in the supporting base structure for a seat, where the seat cushions have foam rubber padding, or the equivalent in springs, designed to give and absorb the ordinary small shocks and jolts in driving, the auxiliary springs in the base structure being of appreciably heavier loading so as to give and absorb some of the shocks and jolts only when larger bumps are encountered that are beyond the spring capacity of the seat cushions to cushion satisfactorily;

(2) the provision of oscillatable radius arms in the base structure attached to the outer ends of heavy spiral torsion springs that are preloaded and hold said arms raised normally into abutment with stops on the spring supporting brackets, said arms being slotted lengthwise of the outer end portions and having the seat bottom adjustably pivotally connected with said arms in said slots, so that a softer ride is obtainable by adjustment farther outwardly on said arms by virtue of the increased leverage obtained with respect to the torsion springs, and vice versa;

(3) the provision of these radius arms under the front and rear portions of the seat for spring cushioned support, using the same kind and size of springs at the rear as at the front, but having the pivotal connection of the seat bottom with the rear arms farther away from the axis of oscillation of said arms than the corresponding pivotal connection of the seat bottom with the front arms, whereby to insure having the rear portion of the seat give more readily than the front portion and thereby insure greater ease and comfort for the driver and improve the riding qualities of the seat support generally, and;

(4) the provision for adjusting the seat bottom in a fore and aft direction relative to the brackets that have the pivotal connections with the spring loaded arms, whereby after the seat support has been adjusted to give the desired riding characteristics in relation to the driver's weight, to enable adjusting the seat forwardly or rearwardly to compensate for the other adjustment and locate the seat properly in relation to leg length.

The invention is illustrated in the accompanying drawing, in which:

Fig. 1 is a side view of a vehicle seat the support for which is made in accordance with my invention;

Fig. 2 is a front view of one end portion of Fig. 1, and

Figs. 3 and 4 are enlarged sectional details taken on the correspondingly numbered lines in Fig. 1.

The same reference numerals are applied to corresponding parts throughout these views.

Referring to the drawing, the reference numeral 5 designates a frame in which a seat bottom cushion 6 is placed and to the bottom of which is riveted, as at 7, a pair of L-shaped arms 8 secured to the opposite end portions of a seat back cushion 9. The cushions 6 and 9 may be of any suitable or preferred construction with the usual amount of give and spring action therein. Hence, while I have indicated sponge rubber padding at 10, it will be understood that the equivalent in coiled compression springs or other springs could be used, and that, although pairs of auxiliary springs 11 and 12 are shown in the front and rear portions of the seat support structure indicated generally by the reference numeral 13, those springs are heavier and are not intended to yield under ordinary driving conditions. In other words, these auxiliary springs are designed to function to assume some of the cushioning action only when larger bumps are encountered that are beyond the capacity of the seat cushion 6 to cushion satisfactorily.

The seat support structure comprises a base frame consisting of two parallel cross-members 14 adapted to be suitably secured to the vehicle frame (not shown) and having a pair of parallel elongated stamped sheet metal brackets 15 riveted onto the opposite end portions thereof in right angle relationship thereto, as indicated at 16. Each bracket 15 has two upstanding ears 17 and 18 on which studs 19 are fixed to provide supports for the inner ends of the spiral torsion springs 11 and 12, in addition to serving as pivotal supports for one end of radius arms 20 and 21, which have posts 22 riveted thereto intermediate the ends thereof and projecting laterally therefrom and serving as abutments for the hooked outer ends 23 of the springs 11 and 12, as shown. The latter are of suitable size and are furthermore preloaded to the extent necessary to remain rigid when the arms 20 and 21, on which the weight of the seat and its occupant is carried, are subjected to minor overloads due to the vehicle's wheels encountering the usual small bumps, as in driving on a fairly smooth roadway. To enable predetermined preloading of the springs and establish a predetermined elevation of the seat, the arms 20 and 21 have movement limiting abutment with the under side of lugs 24 bent laterally from the top edge of the ears 17 and 18. The arms 20 and 21 have elongated slots 25 and 26 provided therein, and an adjustable but otherwise immovable pivot stud 27 carried by the front portion of the seat is entered in slot 25, its location closer to spring 11 giving the seat less leverage with respect to the spring and accordingly making for a harder ride, whereas location thereof farther from spring 11 gives the seat more leverage with respect to the spring and makes for a softer ride. A pivot stud 28 carried by the rear portion of the seat is slidably pivotally received in slot 26 at whatever location closer to or farther from spring 12 is determined by the setting of stud 27 closer to or farther from spring 11. It is preferred to have the back portion of the seat yield more readily than the front portion, because that makes for less awkwardness in steering, and, to accomplish this, the springs 12 under the rear portion of the seat may be given less preload, or, as shown, may be given both a less preload and be deflected with greater leverage than that used in deflecting the front springs 11. Thus, pivots 28 are spaced farther from springs 12 than pivots 27 from springs 11. The leverage ratio in favor of the rear pivots is about 5 to 4 in relation to the front pivots. Since the rear portion of the seat gives more than the front portion, the pivot studs 28 slide back and forth in slots 26 as the back portion of the seat goes down, the seat pivoting more or less on pivot studs 27 as an axis. Studs 27 and 28 are carried on sheet metal brackets 29 and 30 depending from the seat. These brackets are adjustably connected to the frame 5 by bolts 31 extending through holes 32 in the brackets and through registering elongated slots 33 extending in a fore and aft direction in the frame 5 and arms 8, the bolts having nuts 34 threaded on their protruding ends. This construction enables adjusting the seat forwardly or rearwardly to suit the driver's leg length, after the seat support has been adjusted to give the riding characteristics the driver wants. Generally, the same person regularly drives a vehicle of the kind here in question, so that there is no need to provide a more easily adjustable seat slide of the type commonly employed under seats of automobiles, although, of course, such a slide structure could be used between the frame 5 and the brackets 29 and 30, having the fixed slide part secured to the brackets and the adjustable slide part secured to the frame 5.

Studs 27, as shown in Fig. 3, have an enlarged cylindrical portion 35 provided integral therewith intermediate the ends thereof rotatably engageable in a bearing recess 36 provided therefor in the bracket 29, the one reduced end portion 37 being of smooth cylindrical form and extending through a center hole 38 in the bottom of recess 36 and having a retaining collar 39 secured on the protruding end by means of a cotter pin 40. The other reduced end portion 41 has a smooth cylindrical portion slidably received in slot 25 and its outer end portion protruding from the slot is threaded and has a nut 42 and washer 43 thereon, the nut being tightened to clamp the stud to the arm 20 in a selected position of adjustment.

Studs 28, as shown in Fig. 4, have a head 44 on one end, and, next to it, a smooth cylindrical bearing portion 45 which has a sliding pivotal fit in the slot 26, this bearing portion being large in diameter in relation to the rest of the shank 46, thereby defining an annular shoulder 47 against which a collar 48 slipped over the shank is adapted to engage and retain the arm 21 between the head 28 and collar. The latter fits closely in a recess 49 provided therefor in the bracket 30, the shank extending through a center hole 50 in the bottom of recess 49 and having its protruding portion threaded and having a nut 51 threaded thereon with a washer 52 inserted behind it. The collar 48 is thick enough to space the arm 21 with working clearance relative to bracket 30 when nut 51 is tightened, and, of course, the bearing 45 is wide enough to afford working clearance for the arm 21 between the collar 48 and head 44. Hence, whereas stud 27 is fixed to arm 20 and pivots on bracket 29, the reverse is true of stud 28, which is fixed to bracket 30 and has arm 21 pivotally and slidably engaging the same.

In operation, the seat is given a medium adjustment both as respects ride adjustment of the support 13 and leg room adjustment of the seat proper when the vehicle is assembled on the line at the factory and then, when the vehicle gets into the hands of the one who is going to drive it he first makes the ride adjustment of support 13 according to his weight. If he is light he will need more leverage to deflect springs 11 and 12, and will, accordingly, set the studs 27 farther back toward the outer ends of arms 20. Brackets 29 and 30 are preferably interconnected, as by webs 53 to shift studs 28 with studs 27 and maintain a fixed spaced relationship therebetween. Then the leg room adjustment is made by loosening the nuts 34 on bolts 31 and shifting the frame 5 forwardly or rearwardly, as required.

While I have shown and described studs 28 as being slidably and pivotally engaged in slots 26, it should be clear that I do not limit my invention to the specific combination disclosed of studs 27 and 28, because it has been found practical to use the same kinds of studs 27 for pivotal connection of the rear portion of the seat with arms 21 as are used for pivotal connection of the front portion of the seat with arms 20.

It is believed the foregoing description conveys a good understanding of the objects and advantages of my invention. The appended claims have been drawn to cover all legitimate modifications and adaptations.

I claim:

1. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms.

2. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, said seat having a seat cushion containing cushioning means which yields more readily than said springs to absorb and cushion minor shocks, said springs yielding only to absorb and cushion shocks beyond the capacity of the cushioning means in said seat cushion.

3. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, the front torsion springs being less yieldable than the rear torsion springs.

4. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, the torsion springs being all substantially alike and preloaded to a predetermined extent, the front springs being more heavily preloaded than the rear springs so as to be less yieldable.

5. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, the torsion springs being all substantially alike and all preloaded, the seat being connected with the arms so that the front portion has less leverage with respect to the associated springs than the rear portion.

6. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, the torsion springs being all substantially alike and preloaded to a predetermined extent, the front springs being more heavily preloaded than the rear springs so as to be less yieldable, the seat being connected with the arms so that the front portion has less leverage with respect to the associated springs than the rear portion.

7. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, the outer end portions of said arms having elongated slots provided therein longitudinally thereof, and said last mentioned means being adjustable lengthwise of said slots.

8. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, the outer end portions of said arms having elongated slots provided therein longitudinally thereof, and said last mentioned means being adjustable lengthwise of said slots, the pivots for the front portion of the seat being adjustably fixed in the slots of the arms associated with the front springs, and the pivots for the rear portion of the seat being slidably and pivotally engaged in the slots of the arms associated with the rear springs.

9. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, said means being adjustable lengthwise of said arms toward and away from said springs to vary the leverage relative to said springs.

10. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, said means being adjustable lengthwise of said arms toward and away from said springs to vary the leverage relative to said springs, the pivots for the front portion of the seat being adjustably fixed relative to the arms associated with the front springs, and the pivots for the rear portion of the seat being slidably and pivotally engaged on the arms associated with the rear springs.

11. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, means pivotally connecting the seat to be supported to the outer end portions of said arms, said means being adjustable lengthwise of said arms toward and away from said springs to vary the leverage relative to said springs, and means connecting the seat with the last mentioned means so as to enable fore and aft adjustment of the seat relative thereto independently of the other adjustment lengthwise of said arms.

12. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, means pivotally connecting the seat to be supported to the outer end portions of said arms, said means being adjustable lengthwise of said arms toward and away from said springs to vary the leverage relative to said springs, the pivots for the front portion of the seat being adjustably fixed relative to the arms associated with the front springs, and the pivots for the rear portion of the seat being slidably and pivotally engaged on the arms associated with the rear springs, and means connecting the seat with the last mentioned means so as to enable fore and aft adjustment of the seat relative thereto independently of the other adjustment lengthwise of said arms.

13. In a vehicle seat support, the combination of front and rear pairs of torsion springs supported in fore and aft spaced relation adjacent the front and rear portions, respectively, the front pair of springs being of equal preloading and the rear pair of springs being of equal preloading of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, brackets connected with and extending downwardly from said seat with respect to which said seat is adjustable forwardly and rearwardly for leg room adjustment of the seat, and pivot studs adjustably pivotally connecting said brackets with said arms for ride adjustment of the seat support, easier ride being obtained by increase in leverage of said arms relative to said springs by adjustment of said studs farther outwardly on said arms, and vice versa.

14. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, said means being adjustable lengthwise of said arms toward and away from said springs to vary the leverage relative to said springs, the pivots for the front portion of the seat being adjustably fixed relative to the arms associated with the front springs, and the pivots for the rear portion of the seat being slidably and pivotally engaged on the arms associated with the rear springs, the front pair of torsion springs being preloaded alike and the rear pair of torsion springs being preloaded alike but having a lower preloading than the front torsion springs.

15. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, said means being adjustable lengthwise of said arms toward and away from said springs to vary the leverage relative to said springs, the pivots for the front portion of the seat being adjustably fixed relative to the arms associated with the front springs, and the pivots for the rear portion of the seat being slidably and pivotally engaged on the arms associated with the rear springs, the front pair of torsion springs being preloaded alike and the rear pair of torsion springs being preloaded alike, the pivots for the front portion of the seat being closer to the pivoted ends of the arms associated therewith than the pivots for the rear portion of the seat in relation to the pivoted ends of the arms associated therewith, so that the front portion of the seat has less leverage with respect to the associated springs than the rear portion.

16. In a vehicle seat support, the combination of front and rear pairs of torsion springs supported in fore and aft spaced relation adjacent the front and rear portions, respectively, of a seat to be supported thereby, elongated radius arms oscillatably supported relative to said springs and all extending upwardly and rearwardly therefrom and connected with the springs to load the same upon downward deflection of the arms under overload, whereby said springs absorb and cushion shocks for the seat, means limiting upward swing of said arms, and means pivotally connecting the seat to be supported to the outer end portions of said arms, said means being adjustable lengthwise of said arms toward and away from said springs to vary the leverage relative to said springs, the pivots for the front portion of the seat being adjustably fixed relative to the arms associated with the front springs, and the pivots for the rear portion of the seat being slidably and pivotally engaged on the arms associated with the rear springs, the front pair of torsion springs being preloaded alike and the rear pair of torsion springs being preloaded alike but having a lower preloading than the front torsion springs, the pivots for the front portion of the seat being closer to the pivoted ends of the arms associated therewith than the pivots for the rear portion of the seat in relation to the pivoted ends of the arms associated therewith, so that the front portion of the seat has less leverage with respect to the associated springs than the rear portion.

References Cited in the file of this patent

UNITED STATES PATENTS

| | | |
|---|---|---|
| 132,879 | Vote | Nov. 5, 1872 |
| 870,692 | Shepard | Nov. 12, 1907 |
| 2,073,872 | Kliesrath | Mar. 16, 1937 |
| 2,219,456 | Saunders et al. | Oct. 29, 1940 |
| 2,266,092 | Springer | Dec. 16, 1941 |
| 2,460,596 | Roche | Feb. 1, 1949 |
| 2,588,638 | Krotz et al. | Mar. 11, 1952 |
| 2,636,544 | Hickman | Apr. 28, 1953 |
| 2,652,880 | Gundersen | Sept. 22, 1953 |

FOREIGN PATENTS

| | | |
|---|---|---|
| 634,647 | Germany | Sept. 1, 1936 |